United States Patent
O'Mara et al.

(10) Patent No.: US 7,620,592 B2
(45) Date of Patent: Nov. 17, 2009

(54) TIERED PROCESSING METHOD AND SYSTEM FOR IDENTIFYING AND MITIGATING MERCHANT RISK

(75) Inventors: Timothy L. O'Mara, Centereach, NY (US); Amy Marques, Massapequa, NY (US); Margot Luna-Victoria, Woodbury, NY (US); Patricia A. Martell, Yaphank, NY (US)

(73) Assignee: First Data Corporation, Greenwood Village, CO (US)

( * ) Notice: Subject to any disclaimer, the term of this patent is extended or adjusted under 35 U.S.C. 154(b) by 1832 days.

(21) Appl. No.: 09/795,050

(22) Filed: Feb. 26, 2001

(65) Prior Publication Data

US 2002/0120559 A1    Aug. 29, 2002

(51) Int. Cl.
G06Q 40/00    (2006.01)
(52) U.S. Cl. .......................................... 705/38; 705/35
(58) Field of Classification Search .................. 705/35, 705/38
See application file for complete search history.

(56) References Cited

U.S. PATENT DOCUMENTS

| | | | |
|---|---|---|---|
| 4,992,940 A | 2/1991 | Dworkin | |
| 5,262,941 A | 11/1993 | Saladin et al. | |
| 5,357,563 A | 10/1994 | Hamilton et al. | |
| 5,765,138 A * | 6/1998 | Aycock et al. | 705/7 |
| 5,883,810 A | 3/1999 | Franklin et al. | |
| 6,064,375 A | 5/2000 | Veletz et al. | |
| 6,119,103 A | 9/2000 | Basch et al. | |
| 6,141,651 A | 10/2000 | Riley et al. | |
| 6,154,729 A | 11/2000 | Cannon et al. | |
| 7,177,836 B1 * | 2/2007 | German et al. | 705/40 |
| 2001/0039532 A1 | 11/2001 | Coleman, Jr. et al. | |
| 2002/0007302 A1 * | 1/2002 | Work et al. | 705/10 |

FOREIGN PATENT DOCUMENTS

| | | |
|---|---|---|
| WO | WO96/21192 A1 | 7/1996 |
| WO | WO98/34187 A1 | 8/1998 |
| WO | WO99/10850 A1 | 3/1999 |
| WO | WO99/52026 A1 | 10/1999 |
| WO | WO00/00905 A1 | 1/2000 |
| WO | WO00/16219 A1 | 3/2000 |

(Continued)

OTHER PUBLICATIONS

The pressure builds on interchange Peter Lucas. Credit Card Management. New York: Jan. 2001. vol. 13, Iss. 10; p. 32 (6 pages).*

(Continued)

*Primary Examiner*—Lalita M Hamilton
(74) *Attorney, Agent, or Firm*—Sutherland Asbill & Brennan LLP (57) ABSTRACT

A method for identifying merchant risk includes collecting data elements for a plurality of merchants; automatically performing a first level process using the data elements so as to identify a first subset of merchants for review; automatically performing a second level process so as to collect additional information for the first subset of merchants; and automatically performing a third level process using the first subset of merchants and the additional information so as to identify a second subset of merchants requiring further review. A system for practicing the method is also disclosed.

37 Claims, 2 Drawing Sheets

FOREIGN PATENT DOCUMENTS

| | | |
|---|---|---|
| WO | WO00/48053 A1 | 8/2000 |
| WO | WO00/77702 A1 | 12/2000 |

OTHER PUBLICATIONS

Retail Decisions Signs Agreement With First of Omaha Merchant Processing; Partnership Opens Credit Card Fraud Protection Services to Over 70,000 First of Omaha Merchants Business Editors. Business Wire. New York: Oct. 17, 2000. p. 1.*

Outsourced Chargebacks Eliminate Acquirer Risks Credit Risk Management Report. Potomac: Dec. 13, 1999. vol. 9, Iss. 24; p. 1.*

PCT International Search Report for PCT/US02/04787 dated Sep. 18, 2002 (4 pages).

Supplementary European Search Report for EP 02 72 1035 dated Apr. 19, 2007 (2 pages).

Office Action dated May 9, 2005 for Canadian Application No. 2,439,438 (5 pages).

* cited by examiner

TIERED PROCESSING METHOD AND SYSTEM FOR IDENTIFYING AND MITIGATING MERCHANT RISK

BACKGROUND OF THE INVENTION

1. Field of the Invention

The invention relates to a method and system for identifying merchant risk, such as credit risk and/or fraud risk, using an automated, multi-tiered process.

2. Background Art

The use of data cards, such as credit cards, debit cards and other financial account cards, has gained widespread acceptance as a method of paying for goods and services. With the growth of electronic commerce, particularly Internet sales, transactions paid by credit cards will represent an increasingly greater percent of total sales. Credit card transactions, however, expand transaction risk beyond a cardholder and merchant, to include a card issuer (representing the cardholder) and a transaction processor (representing the merchant).

Transaction processors provide merchants with data processing services that facilitate the flow of credit card transaction data and corresponding payments of monies between merchants and card issuers. The flow of transaction data from a merchant to a card issuer via a transaction processor is commonly referred to as "processing" or "clearing" the transactions. The flow of money from a card issuer to a merchant via a transaction processor is known as "settlement". The term "transaction processor", as used herein, generally means a third-party institution that processes credit card transactions independently of a card issuer, but may also include a card issuer or a card issuing association that processes credit card transactions.

In a "point of sale" credit card transaction, a cardholder presents a credit card to a merchant, who records transaction data by using either an electronic terminal or a manually imprinted sales draft. The recorded data includes the amount of the purchase, the cardholder's account number, the card's expiration date, the merchant identification number, and the date of the transaction. In most cases, the cardholder is also required to sign a copy of the receipt. Credit card transactions can also take place in the absence of merchant and cardholder physical proximity or the presentations of a credit card, such as transactions that occur through the mail, telephone or the Internet. These types of transactions pose increased fraud and credit risk as they may involve uncertainty relating to the merchant, cardholder and the product or services purchased; a time lag between purchase and delivery; and lack of physical evidence of cardholder authorization.

Typically at the end of each day (although it can be more or less frequently), the merchant determines the total dollar volume of the credit card transactions completed and prepares a deposit slip indicating that amount. All of the transaction data is then transferred to the merchant's transaction processor and entered into the transaction processor's computer. This transfer may be electronic, in which case a data capture terminal transfers the data directly to the processor's computer. Alternatively, the transfer may involve the deposit of imprinted paper sales drafts and subsequent entry of the data into the computers by the transaction processor.

Once the transaction processor receives the data, the amount of the merchant's "deposit" is verified and recorded. At that point, the transactions are separated according to the type of credit card used to complete the transaction. The transaction processor then transfers the corresponding transaction data to the appropriate credit card issuer or card issuing association. The card issuer posts the individual transactions to the appropriate cardholder's account. The card issuer then provides payment to the transaction processor for the transaction, and bills the cardholder via a credit card statement.

In most cases, settlement occurs very soon after the data is cleared. For example, after a transaction processor receives a merchant's daily transaction data, the balance due the merchant is calculated and paid to the merchant via check, direct deposit, or wire transfer. The transaction processor sorts the transaction data from all of its client merchants according to the type of card used and forwards that data to the appropriate card issuer. The card issuer or card association then determines the balance due and transfers that amount to the transaction processor.

Credit card transactions pose risk to the card issuer and merchant in terms of the creditworthiness and integrity of the cardholder, and the risk that the cardholder does not have the authorization to use the credit card. Over the years, card issuers and merchants have relied on several different methods to protect themselves from fraud or misuse and to verify the validity of a credit card before completing a transaction. Initially, card issuers provided "warning bulletins" to merchants. Warning bulletins, which are still in widespread use, are booklets that list account numbers of credit cards that should no longer be accepted for various reasons. For example, an account number may be included in such a bulletin if the corresponding credit card has been reported lost or stolen, if the cardholder has exceeded his or her credit limit or has become delinquent in the payments to the card issuer, if the credit card was mistakenly issued, or if the credit card is invalid outside the country of origin.

More recently, card issuers and card issuing associations have provided real-time access to their computerized databases. This has allowed merchants to request telephonic authorization for transactions based on a search of a continually updated database before completing each transaction. For a typical transaction authorization, the merchant obtains an authorization code from an authorization source or institution, often via telephone.

For most credit card transactions, the cardholder's risk is minimal due to regulations that apply to card issuers and merchants and that serve to protect consumers. Such regulations, for example, may protect the cardholder from risk by allowing transactions to be "charged back" if they are not authorized by the cardholder, or if the product or service is not provided in accordance with the sales terms. Typically, the cardholder has up to six months from the transaction date to chargeback a transaction. The chargeback process involves notifying the card issuer of a claim about the transaction or a dispute with the merchant. The card issuer may request evidence from the merchant that the transaction was authorized by the cardholder, or that the products or services were delivered as sold. The card issuer then submits this request through the transaction processor to the merchant, and a response from the merchant is required within a specified period of time. If the merchant is unable to successfully defend a chargeback, the transaction is reversed and a debit is passed to the merchant through the processor.

The transaction processor's risk can be considerable due to its role in the credit card transaction, the long lead-time between a transaction date and a chargeback, and the uncertainties surrounding the elements of the credit card transaction (e.g., product or service purchased, merchant and cardholder). The transaction processor assumes ownership of the transaction and is at risk for the full amount. Thus, if the cardholder successfully disputes the transaction, and the merchant's funds are unavailable to fund the chargeback, a credit to the cardholder or the card issuer must be funded by the transaction processor. Unless the processor has set up a reserve amount from the merchant's previous processing funds, the unfunded chargebacks will become a loss for the transaction processor.

There are various scenarios that can result in chargebacks. Examples of such scenarios include products or services not delivered due to operating, cashflow, or other business problems of the merchant; products or services not provided as agreed due to poor merchant business practices; merchant fraud whereby transactions are initiated without the authorization of a cardholder; cardholder fraud whereby legitimate transactions are disputed in an attempt to avoid payment; and third party fraud whereby lost or stolen credit cards or associated account numbers are used. In addition, poor operational practices and record keeping on the part of a merchant may lead to the merchant's inability to defend chargebacks.

Failure to obtain authorization on transactions may also expose a merchant to chargeback risk. Furthermore, merchants who violate regulations of card issuers or card issuing associations may fall victim to scams initiated by other merchants. An example is "factoring" or allowing other merchants to process transactions through the merchant's terminals. The merchant whose account is being used for processing is responsible for any chargebacks that arise from these transactions.

Most merchants who accept credit cards incur some level of chargebacks in the normal course of business. As long as the merchant funds the chargebacks, there will be no loss to the transaction processor. Chargebacks result in a loss to the transaction processor when the merchant can not fund such chargebacks. Thus, in an effort to mitigate risk of loss, the transaction processor may monitor merchant processing trends, which may be indicative of a business problem or change, the merchant's ability to deliver goods and services as agreed and the merchant's viability and financial position to fund chargebacks.

The risk of losses borne by the transaction processor can be considerable and can rapidly escalate if a problem merchant remains undetected. If a merchant is selling products or services that he does not intend to or cannot deliver, or that are not as agreed, such transactions will eventually become chargebacks. However, it is difficult for the transaction processor to determine which sales will charge back at the time the sales are made. Because there may be a time lag of at least a few months before chargebacks begin to appear, the transaction processor must rely on other signs to detect merchant risk and the potential for loss before it is too late. At the same time, however, there may be a large number of good merchant accounts that can exhibit processing behavior similar to that of bad accounts. For example, a sales surge or increase in average transaction amount may reflect a positive business change for a good merchant (such as expansion into a new line of business or additional outlets) or a negative business change for a bad merchant (such as a going out of business sale or fraud). The risk management challenge is to be able to quickly identify risky merchant behavior and to distinguish this behavior between good and bad accounts.

Merchant risk for a particular merchant is a function of the merchant's industry, credit card processing volumes, business practices, financial strength, viability and payment trends in the industry, as well as the extent to which there is delivery of a product or service. These elements can be used to estimate the level of merchant risk and to monitor for potential chargebacks. Changes in processing volumes and trends, negative card authorization results, changes in average transaction amounts and increasing sales returns may also represent signs of potential risk. In addition, there are external signs that are available through credit vendors that indicate a merchant's payment experience with its suppliers as well as outstanding legal actions. Transaction processors may also conduct investigations on merchants that may include obtaining bank references, supplier references and cardholder contacts; reviewing financial statements; and visiting merchants.

One method currently used by transaction processors to detect risky merchant behavior involves reviewing daily hard copy mainframe reports, which identify merchants whose prior day's processing activity has met predefined criteria. For example, a hard copy report may list all merchants whose processing volume or average sales ticket amount exceeded expected levels. After the hardcopy reports have been reviewed, a subset of merchants may be selected for further review.

Under this approach, there may be considerable "noise" or "false positives", as both good and bad accounts may meet the pre-defined criteria of a particular report. Furthermore, the reports include only limited data on merchants related to the underlying report criteria, and fail to provide a comprehensive snapshot of each merchant's processing profile. In addition, there is no efficient way to cross-reference various reports, or to determine if a particular merchant appeared on a previous report. Given the volume of merchants in a transaction processor's portfolio and the various criteria that need to be monitored, this approach is both labor intensive and inefficient. Furthermore, because of the lag time for identifying problem merchants, the time available to mitigate risk is diminished.

Once the subset of potential problem merchants has been selected, an analyst must typically go to various sources to piece together a processing and external behavior profile for each merchant. The analyst may spend a considerable amount of time gathering additional information on the merchant and conducting further investigation steps. Any recommended mitigative action also typically needs to be documented in a file and presented to higher authority levels for concurrence. This entire review process may further delay action necessary to mitigate risk.

Another conventional technique is known as parameter analysis. A parameter analysis detection scheme targets certain merchants using a small number of database fields combined in a simple Boolean condition or equation. An example of such an equation is:

If (number of transactions in 24 hours>$X$) and (more than $Y$ dollars authorized) then flag this account as high risk.

Values for X and Y may be selected so as to satisfy either a required detection rate or a required false positive rate. Since only single-variable threshold comparisons are used, complex interactions among variables are not captured. Consequently, this technique may discriminate poorly between risky and valid account behavior, resulting in low capture rates and high false positive rates. Additionally, an effective risk detection model generally requires more variables than conventional parameter analysis systems can handle. This approach also requires additional investigation and analyst review before a decision can be reached as to whether any action should be taken to mitigate risk.

SUMMARY OF THE INVENTION

The invention addresses the shortcomings of the prior art by providing a method and system for identifying merchant risk using an automatic, tiered processing approach. The method and system of the invention are significantly more efficient and accurate than prior systems and methods. As a result, false positives may be significantly reduced.

Under the invention, a method for identifying merchant risk includes collecting data elements for a plurality of merchants; automatically performing a first level process using the data elements so as to identify a first subset of merchants for review; automatically performing a second level process so as to collect additional information for the first subset of merchants; and automatically performing a third level process using the first subset of merchants and the additional information so as to identify a second subset of merchants requiring further review.

The method may involve utilizing flexible, user-maintained rules logic in one or more of the processes. For example, the step of automatically performing a first level process may include applying at least one detection rule to the data elements so as to identify the first subset of merchants. As another example, the step of automatically performing a first level process may include applying at least one watchlist rule to at least one of the data elements.

Furthermore, the step of automatically performing a first level process may include determining a rule score and/or a risk score for each merchant identified in the first subset of merchants.

The step of automatically performing a second level process may include applying at least one trigger rule to the first subset of merchants so as to selectively identify merchants for which external scoring is to be obtained. Such external scoring may include, for example, credit scoring from a credit vendor.

In addition or as an alternative, the step of automatically performing a second level process may include applying at least one trigger rule to the first subset of merchants so as to selectively identify merchants for which multiple credit card re-authorizations are to be obtained.

The step of automatically performing a third level process may include applying at least one elimination rule to the first subset of merchants and the additional information so as to identify the second subset of merchants. Advantageously, with such a process, merchants that are false positives may be eliminated from further review, thereby improving accuracy of the method.

Further under the invention, an apparatus for identifying merchant risk is provided, and the apparatus includes a computer system configured to periodically receive data elements for a plurality of merchants. The computer system includes instructions for performing first level, second level and third level processes so as to identify merchant risk. In addition, the computer system is operative to perform the first level process using the data elements so as to identify a first subset of merchants for review. The computer system is further operative to perform the second level process so as to obtain additional information for the first subset of merchants. Furthermore, the computer system is operative to perform the third level process using the first subset of merchants and the additional information so as to identify a second subset of merchants requiring further review.

These and other objects, features, and advantages of the present invention are readily apparent from the following detailed description of the best modes for carrying out the invention when taken in connection with the accompanying drawings.

DETAILED DESCRIPTION OF THE PREFERRED EMBODIMENT(S)

Figure 1:
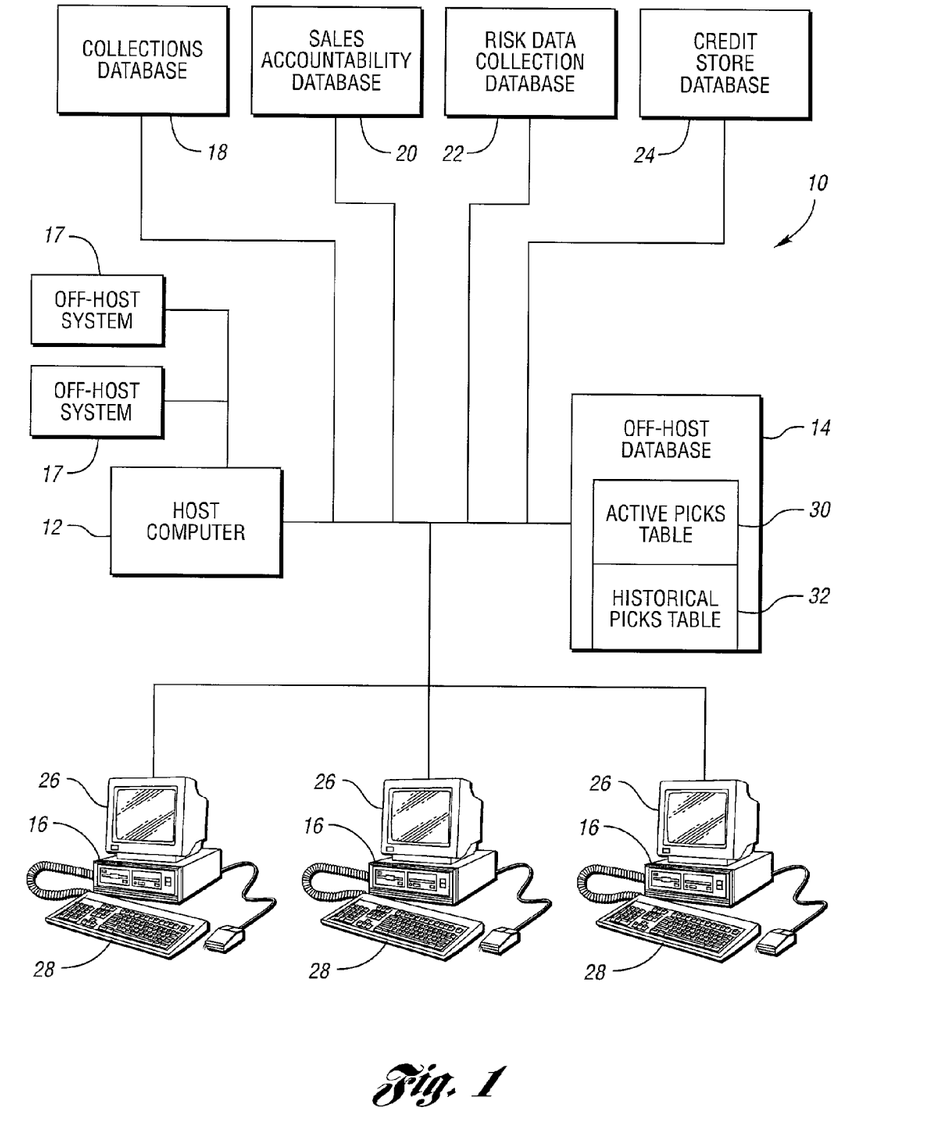
FIG. 1 is a schematic diagram of a system according to the invention for identifying and mitigating merchant risk.

FIG. 1 shows an apparatus or system 10 according to the invention for identifying merchant risk using a tiered processing approach, as explained below in detail. The system 10 includes a mainframe or host computer 12, an off-host database 14 in communication with the host computer 12, and one or more computer terminals or workstations 16 in communication with the host computer 12 and the database 14. Although only three workstations 16 are shown in FIG. 3, the system 10 may include any suitable number of workstations 16 such as fifty or more. The host computer 12 may also be in communication with one or more off-host systems 17, such as computers or databases, which may provide file feeds to the host computer 12, as explained below in detail. The host computer 12 and/or database 14 are also in communication with one or more additional databases, such as a Collections Database 18, Sales Accountability Database 20, Risk Data Collection Database 22, and Credit Score Database 24 for obtaining information regarding one or more merchants. Alternatively, one or more of the additional databases 18-24 may be provided as part of the host computer 12 and/or database 14. As yet another alternative, in lieu of the arrangement described above, the system 10 may include one or more computers and/or databases that cooperate to identify merchant risk as explained below in detail.

The host computer 12, database 14 and workstations 16 are preferably, but not necessarily, owned and operated by a financial services institution engaged in the business of performing merchant risk analysis, such as a transaction processor. The transaction processor may also own and operate one or more of the off-host systems 17 and/or additional databases 18-24.

The host computer 12 and/or the database 14 include hardware and/or software for automatically performing multiple processes to determine merchant risk and to identify which merchants, if any, require review by system users, such as analysts of the transaction processor. These processes may involve information gathering, information evaluation, and interaction between various components of the system 10, as explained below in detail.

Each workstation 16 is configured to communicate with the host computer 12 and/or database 14 so as to assist analysts or other users in reviewing one or more merchants, which may also be referred to as merchant accounts, identified by the above processes. Each work station 16 includes a display device 26 for displaying information obtained from the host computer 12 and/or database 14, and a data entry device such as a key pad 28 for processing information displayed on the display device 26, or for communicating with the host computer 12 and/or database 14.

Figure 2:
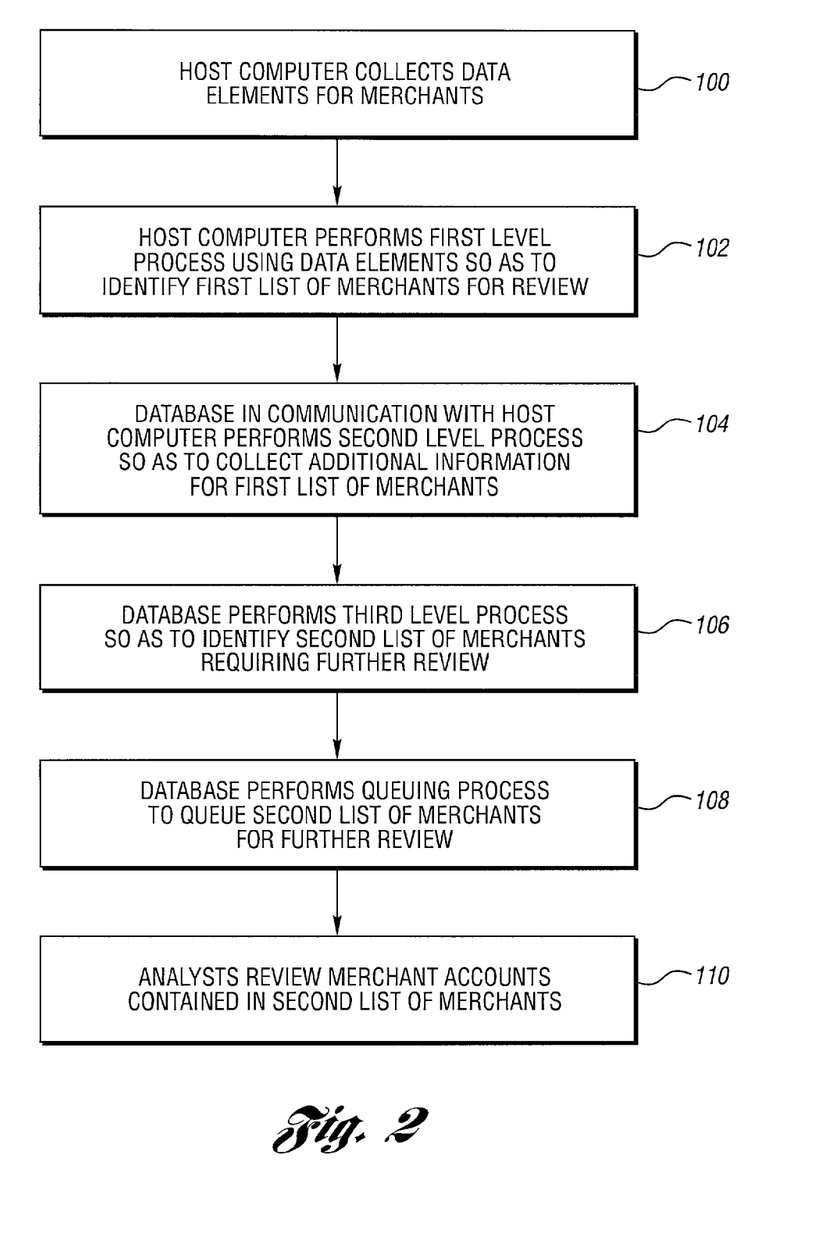
FIG. 2 is a flow chart illustrating operation of a method according to the invention for identifying and mitigating merchant risk.

Referring to FIGS. 1 and 2, operation of a method or system, such as system 10, for identifying merchant risk according to the invention will now be described. As will be appreciated by one of ordinary skill in the art, the steps identified in FIG. 2 represent control logic or instructions that may be effected or implemented by hardware, software, or a combination of hardware and software.

First, at step 100, the host computer 12 receives, compiles, calculates, or otherwise collects a broad range of information or data elements in various data element categories for individual merchants, such as outlets, as well as groups of merchants, such as chains of outlets. Data element categories may include, for example, Gross Sales, Sales Average Ticket, Credits, Credit Average Ticket, Keyed Sales, Keyed Average Ticket, Authorizations, Closed Chargebacks, Open Chargebacks, Retrievals, Automated Clearing House (ACH) Rejects, Funding Transfers, Inactivity, External Credit Score, Internal Credit and Fraud Score, Recurring Transactions, Same Card Transactions, Even Amount Transactions, Card Type, Customer Service Inquiries, External Warnings, Red Flag Status Changes, Standard Industry Code (SIC) baselines, Risk Calculations, Mainframe Data, Front End Review Data, and Paperless Transaction System (PTS) Rejects.

Gross Sales refers to gross sale data for certain time periods, such as daily, month to date, and yearly. Sales Average Ticket refers to the average dollar value per sales ticket or receipt. Credits refers to credit transactions such as returns, and Credit Average Ticket refers to the average dollar value of such transactions. Keyed Sales refers to transactions in which a credit card is not physically present, and Keyed Average Ticket refers to the average dollar value of such transactions. Authorizations refers to the number of credit card authorizations obtained by a merchant. Closed Chargebacks refers to chargebacks that were debited to a merchant, and Open Chargebacks refers to chargebacks that are still under review. Retrievals refers to transactions that are in dispute and for which additional information has been requested. ACH Rejects refers to rejected debit transactions of a merchant account. Funding Transfers refers to transfers of money, relating to deposited merchant transactions, from the transaction processor to a merchant account. Inactivity refers to merchant inactivity regarding submission of deposits for funding. External Credit Score refers to credit scores obtained from a credit vendor. Internal Credit and Fraud Score refers to credit and/or fraud scores that are calculated and maintained by the transaction processor. Recurring Transactions refers to transactions having the same dollar amount. Same Card Transactions refers to transactions involving the same credit card. Even Amount Transactions refers to transactions involving an even dollar amount above a predetermined level. Card Type refers to type of credit card, such as government agency card, foreign card, or corporate card. Customer Service Inquiries refers to merchant inquiries regarding funding of deposited transactions. External Warnings refers to external warning indicators such as merchant payment history to suppliers and status of any legal actions against a merchant. Such factors may be obtained, for example, from an external credit vendor. Red Flag Status Changes refers to merchant status changes, such as change in address, telephone number, business name, etc. SIC Baselines refers to baseline values for any of the above categories that have been set based on SIC'S. Risk Calculations refers to internal risk calculations, such as risk dollar amounts or potential dollar amounts at risk, that are calculated and maintained by the transaction processor. Typically, such risk calculations are obtained using a formula that considers such factors as percentage of transactions requiring delivery, credit ratio, chargeback ratio, etc. Mainframe Data refers to data maintained by the transaction processor, such as merchant demographic data. Front End Review Data refers to initial credit reviews of merchants. Finally, PTS Rejects refers to transactions that were declined because they exceeded a maximum, predetermined dollar value.

Within the above categories, the inventors of the present invention have developed a number of unique data elements that have been found to be especially predictive of merchant risk. These include, but are not limited to, Prorated Sales, Last Year Sales, Normal Sales, Max Days Since Last Deposit, Max Same Card Sales, Max Same Card Credits, 30 Day Even Dollar Amount, 30 Day Funding Inquiry, Red Flag Date, SIC Keyed %, SIC Sales Average Ticket, SIC Annual Sales, Keyed Risk, Prorated Risk, Daily Not Approved Authorization, Number Entries of Salesperson in past 90 days, Number of System Picks in Last 30 days.

Prorated Sales refers to data elements that predict future sales, such as monthly or yearly sales, based on previous sale activity. Last Year Sales refers to sales activity that occurred approximately one year ago. Normal Sales refers to average monthly sales over the past six months. Max Days Since Last Deposit refers to the last time a merchant made a transaction deposit to request funding. Max Same Card Sales refers to the maximum number of sale transactions involving the same credit card. Max Same Card Credits refers to the maximum number of credit transactions involving the same credit card. 30 Day Even Dollar Amount refers to the number of times over the last 30 days that a particular merchant has processed even dollar transactions over a predetermined amount. 30 Day Funding Inquiry refers to the number of times in the last 30 days a particular merchant has checked on the status of a funding request for deposited transactions. Red Flag Date refers to the date a merchant changed his address, telephone number, business name, etc. SIC Keyed % refers to the percent of keyed transactions for a particular SIC. SIC Sales Average Ticket refers to the average dollar amount per sales ticket or receipt for a particular SIC. SIC Annual Sales refers to total sales over a one year period for a particular SIC. Keyed Risk is a data element that indicates a risk dollar amount, or potential dollar amount at risk, based on the percentage of transactions involving keyed entry of credit card information. Such transaction typically involve a delivery. Prorated Risk is a risk dollar amount based on projected activity of a merchant. Daily Not Approved Authorization refers to the number of transactions per day that are not approved. Number Entries of Salesperson in Past 90 Days refers to the number of times in the past 90 days that a particular salesperson has been found to have signed up a high risk merchant. Furthermore, Number of System Picks in Last 30 Days refers to the number of times a particular merchant has been identified as potentially risky by the system 10 in the last 30 days.

In addition, or as an alternative, any suitable data elements within the above categories or other categories may be collected. Data elements and corresponding categories are preferably selected so as to effectively predict merchant risk.

Preferably, the data elements are collected periodically, such as on a nightly basis. The data elements may be collected, for example, from files on the host computer 12 or through file feeds from off-host systems 17. The off-host systems 17 may, for example, provide data elements maintained by various departments of the transaction processor. Furthermore, the data elements are stored in the host computer 12 for a predetermined amount of time, such as seven days. With such an arrangement, the host computer 12 maintains a continually refreshed collection of data elements.

Next, at step 102, the host computer 12 performs a first level screening process or level one process using the data elements, so as to automatically identify a first subset or list of merchants that may require review. For example, the host computer 12 may include a first set of rules, or level one rules, that may be automatically applied to the data elements. The first list of merchants is then defined as those merchants that satisfy criteria or requirements of the level one rules. Thus, the level one rules may be referred to as detection rules that are used to detect the first list of merchants.

Examples of level one rules are as follows: 1) if number of chargebacks exceeds X % of sales, then pick this merchant for first list of merchants; and 2) if current daily sales exceed average daily sales for the previous fifteen days by Y % or more, then pick this merchant for first list of merchants. In the above examples, X and Y are predetermined percentages.

Examples of more detailed level one rules include: 1) flag merchant if merchant began processing transactions within last fifteen days, under ten outlets are chained to merchant, gross sales processed to date exceed expected sales volumes by at least R %, daily or seven day average ticket is greater than $S, and daily or seven day percentage of keyed transactions is greater than T %; and 2) flag merchant if merchant began processing transactions more than fifteen days ago but less than one year ago, less than 10 outlets are chained to merchant, and thirty day rolling gross sales exceed normal monthly sales of merchant (based on a six month norm and excluding current month) by more than U % and $V (provided that either the merchant's average ticket is greater than $W and percentage of keyed transactions is greater than X %, or the merchant's thirty day gross sales exceed normal monthly sales by more than Y % and $Z). In the above examples, R-Z are predetermined percentages or dollar amounts as appropriate.

Level one rules may also be configured as "watchlist" rules that are tied to a specific merchant or merchants. In other words, watchlist rules will only be applied to the specific merchant or merchants, and are configured to monitor particular behavior. For example, a watchlist rule may be set up to flag or otherwise detect a specific merchant for review if the merchant processes transactions above a certain dollar amount, which dollar amount may have previously been set as a limit for the specific merchant.

Alternatively, the level one rules may be any suitable rules that are used to identify merchants for inclusion in the first list of merchants. Furthermore, the level one rules preferably, but not necessarily, are applied independently of each other, and can be created or modified at any time to better target merchants of interest.

Advantageously, the system 10 also provides the ability to exclude one or more merchants from one or more level one rules so as to eliminate false positives. For example, if a particular merchant has previously been detected for review by a particular level one rule, but has been found to be a low risk merchant during a subsequent review, then the particular merchant may be temporarily or permanently excluded from the particular level one rule during subsequent first level processes.

The level one process may also include determining a rule score for each merchant contained in the first list of merchants. Such a rule score may be determined, for example, based on the number of level one rules satisfied or broken. Furthermore, the level one rules may be weighted differently based on perceived importance. For example, a level one rule that is highly indicative of fraud may be weighted five times as much as another level one rule that is less indicative of fraud.

The first list of merchants may be stored on the host computer 12 and/or the database 14, along with the associated data elements and rule scores. Preferably, but not necessarily, the first list of merchants and associated data elements and rule scores are stored in Active Picks Table 30 of database 14. Each stored merchant account, along with associated data elements and rule score, may be referred to as a snapshot record of the merchant. Furthermore, the snapshot records may be stored in the Active Picks Table 30 for a predetermined period of time, such as thirty days. The snapshot records may then be transferred to a Historical Picks Table 32 of database 14, where they may be maintained for an extended period of time such as six months, or indefinitely.

Next, the database 14 performs a second level process or level two process for the first list of merchants, as indicated at step 104. For example, during the second level process, the database 14 may operate to obtain or otherwise collect additional information, such as additional data elements, from the host computer 12 and/or other databases, such as databases 18-24, for the first list of merchants. For example, Collections Database 18 may provide additional information regarding collection balances owed by one or more merchants on the first list of merchants. As another example, Sales Accountability Database 20 may provide additional information relating to prior negative activity associated with a salesperson who signed up one or more of the merchants, contained in the first list of merchants, for processing services with the financial services institution. As yet another example, Risk Data Collection Database 22 may provide additional information relating to prior instances of level one process detection and/or risk review of one or more of the merchants contained in the first list of merchants. More specifically, the Risk Data Collection Database 22 may provide the number of times a particular merchant has been identified for review, using the level one rules, in a certain period of time, such as within the last thirty days; and/or the number of times a particular merchant has been dropped from review or identified for a deferred review by an analyst. Alternatively, the additional information referred to above may be collected for any merchant within system 10, whether or not the merchant is contained in the first list of merchants.

In addition, as part of the level two process, the database 14 may include a second set of rules, or level two rules, that are automatically applied to the first list of merchants and associated data elements, rule scores and/or additional information, so as to selectively identify merchants for which additional processing is desired. Because the level two rules trigger additional processing for certain merchants, the level two rules may be referred to as trigger rules.

The additional processing referred to above may include obtaining credit scores from a suitable source, such as Credit Score Database 24, which may be owned and/or operated by a credit vendor. In addition, behavioral scores may calculated by the database 14 or other component of the system 10. Behavioral scores are risk scores based on merchant transaction processing behavior. Alternatively or supplementally, the additional processing may include obtaining re-authorizations for credit cards previously authorized by one or more of the merchants contained on the first list of merchants. For example, select credit card accounts corresponding to credit cards that were previously accepted by a particular merchant over a certain period of time, such as the previous thirty days, may be submitted to an authorization source for re-authorization.

Examples of level two rules include: 1) if merchant's prorated risk is greater than $X, then obtain credit and behavioral scores; and 2) if merchant's daily average ticket is greater than normal average ticket by more than Y %, then obtain re-authorizations for Z credit card accounts. In the above examples, X-Z are predetermined numbers.

Next, the database 14 performs a third level screening process or level three process so as to identify a second subset or list of merchants requiring further review, as indicated at step 106. For example, the database 14 may include a third set of rules or level three rules that may be automatically applied to the first list of merchants and associated data elements, rule scores, additional information, credit scores, behavioral scores, and/or re-authorization results, so as to determine the second list of merchants. Examples of level three rules include: 1) if credit score is above X (where X is a predetermined credit score), then eliminate merchant from further review; and 2) if merchant satisfied only level one rule Y (where Y refers to a particular level one rule), then eliminate merchant from further review. Thus, the level three rules, which may be referred to as elimination rules, may be used to eliminate false positive merchants from the first list of merchants.

Furthermore, the level three process may be used to prioritize the second list of merchants for further review at one or more of the workstations 16. As part of the level three process, the database 14 may include prioritizing rules that are automatically applied to data elements and/or other information from the above processes. For example, a priority rule may set a particular merchant as a high priority if the merchant's rule score from the level one process is greater than 30.

Next, at step 108, the database 14 performs a queuing function or process so as to queue the second list of merchants for further review by analysts at the workstations 16. The queuing process is used to control workflow distribution through the use of review queues that serve to organize workloads and segregate merchants for specialized reviews. The database 14 may include queue rules that operate to balance workloads between analysts and/or that operate on the data elements and/or other information gathered for each merchant so as to segregate the merchants into review queues. For example, the database 14 may include a queue rule that sends all merchants having a particular SIC and processing volume to a particular queue.

Queue rules may be used to set up "push" or "pull" queues such that merchant accounts are either automatically pushed to an assigned analyst's' queue, or appear in a general queue until one of the analysts pulls the merchant account into his own queue. Each analyst may have multiple queues including a normal queue, which contains pushed merchant accounts and merchant accounts drawn from the pull queues; an attention queue, which contains messages from other analysts regarding merchant accounts under review or other comments; a follow up queue, which contains all merchant accounts for which the analyst or other user has requested additional information or action; and a response queue for monitoring responses to referrals to other departments or areas that were initiated by the particular analyst. Any specialized pull queues set up within a particular review hierarchy will also be assigned to certain analysts.

In addition, the queuing process may also provide managers or others the ability to redistribute merchant accounts from one analyst's queue to another. Each review hierarchy may also have a referral queue, which contains all of the referral requests initiated by other hierarchies or departments. The referral queue is typically a pull queue to which certain analysts are assigned. There is also a default queue to capture any merchant accounts that are sent to a workstation 16 or workstations 16 without a designated queue available.

The queues may be displayed in a queue summary screen on display device 26 of each workstation 16. The queue summary screen lists all the queues to which a particular analyst is assigned, and indicates the total number of merchant accounts in each queue by status (e.g., pending review, under investigation, pending termination). Each workstation 16 may also be used to display additional details for each queue, which may be referred to as a queue layout. For example, by highlighting a particular queue displayed on a display device 26 of a particular workstation 16, the merchant accounts included in the queue will be displayed on the workstation 16. The queue layout for a particular queue may also include any of the data elements described above for each merchant in the queue. Queue layouts may also vary from one queue to another, and each queue layout may be changed at any time. Furthermore, each queue layout is maintained by a particular analyst and serves to highlight key risk characteristics for merchants in queue for review, so as to assist the analyst in prioritizing reviews. In addition, if a priority level was assigned to a merchant account upon entering a particular workstation 16 or at some other point, the merchant account may appear in a different color that reflects the priority level.

Next, at step 110, one or more analysts may review or otherwise investigate merchant accounts contained in the second list of merchants using one or more of the workstations 16. As part of the review process, a review record may be developed for each merchant account that is reviewed.

Advantageously, each workstation 16 is operational to interact with one or more components of the system 10, such as database 14, so as to assist analysts in performing reviews. For example, each workstation 16 is preferably operative to display comprehensive screens that present the full range of data elements and other information for each merchant established during the above processes. Each work station 16 may also be used to view merchant snapshot records from prior dates, and to view all merchants that were identified by level one rules during a first level process, whether the merchants were actually sent for further review to a workstation 16 or not, via the Active Picks Table 30 and/or the Historical Picks Table 32. As a result, merchant snapshot records may be viewed at any time and for any purpose, such as to perform analyst reviews, on-going monitoring of a particular merchant, and/or "post mortem" reviews of merchant accounts that became losses.

Furthermore, each workstation 16 may be used to search for any merchant within any hierarchy (which may be restricted to read-only access), whether or not the merchant was detected by a level one rule, so as to view data elements, merchant snapshot records, current review records, and/or completed review records related to the merchant. Each workstation 16 may also be used to select from analyst maintained tables the risks, strengths and review steps taken to document a particular review. In addition, each workstation 16 may be used to send a review decision for concurrence to analysts or other users with appropriate signing or approval authority; to re-calculate merchant risk; to document supplier, bank and cardholder investigations; to view, download and print analyst and management reports; and to take mitigative actions against a merchant or merchants based on the results of the review. Such mitigative actions may include suspending funding to a merchant or accessing a reserve account of merchant. Another mitigative action includes approving funding or diverting funds for a merchant that is set up on a revolving payment plan. Additional details regarding revolving payment plans are included in co-pending U.S. patent application Ser. No. 09/474,572, which is hereby incorporated by reference in its entirety.

Advantageously, through the use of hierarchies and/or user-defined set up criteria, the system 10 and method of the invention are highly flexible. Review hierarchies may be set up by department, area, or otherwise, based on, for example, type of merchant risk (e.g., fraud risk, credit risk, etc.), level of merchant risk (e.g., high, low, etc.), merchant type, and/or other factors. Within each hierarchy, analysts or other users of the system 10 may define set up criteria, such as applicable rules, user access levels, workflow, parameter tables and concurrence levels. For instance, an analyst or other user of the system 10 may use a workstation 16 to modify an existing level one rule, or to introduce a new level one rule into the system 10. These changes may be entered through a rule editor screen displayed on the work station 16. The system 10 also enables new rules or modified rules to be tested against existing stored data elements so as to determine the effect the rules will have. For example, a new level one rule may be tested against existing stored data elements so as to generate a list of merchants that satisfy the rule.

Each workstation 16 may also be used to generate and print various reports, such as reports that provide detailed listings of merchant reviews by status, reports that summarize analyst productivity and reports that summarize review timeliness. Advantageously, each workstation 16 may be used to hyperlink from a particular report to a review and/or to a particular analyst's queues.

Other reports include reports that indicate which data elements and/or level one rules are most effective in identifying risk. This information may then be used to delete, create or modify level one rules so as to re-focus detection using the most risk-predictive data elements and/or level one rules.

Because user access levels and concurrence levels can be easily defined and/or modified, the system 10 and method of the invention may be effectively tailored for use by analysts or users with various perspectives on risk management and/or various experience levels with risk management.

Although each hierarchy shares some commonality, such as the database 14, system tables, processing screens, function and report formats, the system 10 can essentially be customized to meet the needs of each specific hierarchy. Each hierarchy can also be restricted from viewing or accessing merchant accounts in other hierarchies, and/or from using certain functionality. As a result, the system 10 may be utilized by users outside of the financial services institution.

The system 10 also includes a number of features that facilitate communication between analysts or other users. For example, the system 10 provides user maintained "messages of the day" that can be set up for each hierarchy to communicate risk related or department related issues. Users can modify these messages at any time. The system 10 also includes an Attention Message feature, which enables a user to send a message to another user; the message may be either generic or linked to a specific review. Furthermore, the system 10 includes a Referral Approval Request feature, which facilitates referring an account to another hierarchy.

Communication to banks and supplier references, as well as to merchants, is facilitated by a Letter and Fax feature included in the workstations 16. Each workstation 16 offers template letters, which are populated with key data elements from a review and can be modified by an analyst. The letters can then be automatically faxed to a supplier, bank or merchant, and copies can be electronically retained in the system 10. For example, a copy of each letter may be electronically appended to a corresponding review report prepared at a workstation 16.

The system 10 and method of the invention provide efficient and effective evaluations of merchant risk. Furthermore, because of the automatic tiered processing approach, accuracy is significantly improved compared to prior systems and methods. As a result, the false positive rate may be significantly reduced, thereby allowing for more rapid and effective risk mitigation and reduction in losses.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A computer implemented method for identifying merchant risk, the method comprising:
    collecting, by a host computer, data elements for a plurality of merchants;
    automatically performing, by the host computer, a first level process using the data elements so as to identify a first subset of merchants for review;
    storing results of the first level process including a list of the first subset of merchants in a database that is in communication with the host computer;
    automatically performing, by the database, a second level process so as to collect additional information for the first subset of merchants;
    automatically performing, by the database, a third level process using the first subset of merchants and the additional information so as to identify a second subset of merchants from the first subset of merchants requiring additional processing, wherein the data elements used in the first level process and the additional information used in the third level process indicate that a merchant included in the second subset of merchants is at risk of not being in a financial position to fund chargebacks associated with that merchant; and
    transmitting, from the database, results of the third level process associated with at least one of the second subset of merchants to at least one workstation for further review.

2. The method of claim 1 wherein the step of automatically performing a first level process includes applying at least one detection rule to the data elements so as to identify the first subset of merchants.

3. The method of claim 2 wherein the step of applying at least one detection rule comprises comparing merchant chargebacks to a predetermined percentage of merchant sales.

4. The method of claim 2 wherein the step of applying at least one detection rule comprises comparing current daily sales to average daily sales for a previous multiple day period for each of the plurality of merchants.

5. The method of claim 1 wherein the step of automatically performing a first level process includes applying at least one watchlist rule to at least one of the data elements.

6. The method of claim 1 wherein the step of automatically performing a first level process includes determining a rule score for each merchant identified in the first subset of merchants.

7. The method of claim 1 wherein the step of automatically performing a first level process includes determining a risk score for each merchant identified in the first subset of merchants.

8. The method of claim 1 wherein the step of automatically performing a second level process includes applying at least one trigger rule to the first subset of merchants so as to selectively identify merchants for which external scoring is to be obtained.

9. The method of claim 8 further comprising automatically obtaining a risk score based on merchant transaction processing behavior for each selectively identified merchant.

10. The method of claim 8 wherein the step of applying at least one trigger rule comprises comparing merchant prorated risk to a predetermined dollar amount.

11. The method of claim 1 wherein the step of automatically performing a second level process includes applying at least one trigger rule to the first subset of merchants so as to selectively identify merchants for which multiple credit card reauthorizations are to be obtained.

12. The method of claim 1 wherein the step of automatically performing a third level process includes applying at least one elimination rule to the first subset of merchants and the additional information so as to identify the second subset of merchants.

13. The method of claim 12 wherein the step of applying at least one elimination rule comprises eliminating a particular merchant from further review if the credit score for the particular merchant is above a predetermined credit score.

14. The method of claim 1 wherein the step of automatically performing a third level process includes prioritizing the second subset of merchants.

15. The method of claim 1 wherein the data elements include predicted future sales based on previous sale activity.

16. The method of claim 1 wherein the data elements include dollar amount at risk based on projected merchant activity.

17. The method of claim 1 wherein the data elements include number of transactions in a particular time period that were not approved.

18. The method of claim 1 wherein the data elements include number of times in a particular period of time a merchant has been identified as potentially risky.

19. A computer implemented method for identifying merchant risk, the method comprising:
    collecting, by a host computer, transaction data elements for a plurality of merchants;
    automatically applying, by a host computer, a first set of rules to the transaction data elements so as to identify a first list of merchants for review and to determine a rule score for each merchant included in the first list of merchants;
    storing the first list of merchants and rule scores for each merchant included in the first list of merchants in a database that is in communication with the host computer;
    automatically applying, by the database, a second set of rules to the first list of merchants and associated data elements and rule scores so as to selectively identify merchants for which credit scores are to be obtained;
    automatically obtaining, by the database, a credit score for each selectively identified merchant;
    automatically applying, by the database, a third set of rules to the first list of merchants and associated data elements, rule scores and credit scores so as to determine a second list of merchants from the first list of merchants requiring additional processing, wherein the associated data elements, rules scores, and credit scores used in the application of the third set of rules indicate that a merchant included in the second list of merchants is at risk of not being in a financial position to fund chargebacks associated with that merchant; and
    transmitting, from the database, results of the application of the third set of rules associated with at least one of the second list of merchants to at least one workstation for further review.

20. An apparatus for identifying merchant risk, the apparatus comprising:
    a computer system configured to periodically receive data elements for a plurality of merchants, the computer system including instructions executed by a processor of the computer system to:
        perform a first level process using the data elements so as to identify a first subset of merchants for review,
        perform a second level process so as to obtain additional information for the first subset of merchants,
        perform a third level process using the first subset of merchants and the additional information so as to identify a second subset of merchants from the first subset of merchants that require additional processing, wherein the data elements used in the first level process and the additional information used in the third level process indicate that a merchant included in the second subset of merchants is at risk of not being in a financial position to fund chargebacks associated with that merchant, and
        transmit results of the third level process associated with at least one of the second subset of merchants to at least one workstation for further review.

21. The apparatus of claim 20 wherein the computer system includes a host computer and an off-host database in communication with the host computer.

22. The apparatus of claim 21 wherein the host computer includes the instructions for performing the first level process, and the off-host database includes the instructions for performing the second level and third level processes.

23. The apparatus of claim 20 wherein the instructions for performing the first level process include instructions for applying at least one detection rule to the data elements so as to identify the first subset of merchants.

24. The apparatus of claim 20 wherein the instructions for performing the first level process include instructions for applying at least one watchlist rule to at least one of the data elements.

25. The apparatus of claim 20 wherein the instructions for performing the first level process include instructions for determining a rule score for each merchant identified in the first subset of merchants.

26. The apparatus of claim 20 wherein the instructions for performing the first level process include instructions for determining a risk score for each merchant identified in the first subset of merchants.

27. The apparatus of claim 20 wherein the instructions for performing the second level process include instructions for applying at least one trigger rule to the first subset of merchants so as to selectively identify merchants for which external scoring is to be obtained.

28. The apparatus of claim 20 wherein the instructions for performing the second level process include instructions for applying at least one trigger rule to the first subset of merchants so as to selectively identify merchants for select credit card reauthorizations are to be obtained.

29. The apparatus of claim 20 wherein the instructions for performing the third level process include instructions for applying at least one elimination rule to the first subset of merchants and the additional information so as to identify the second subset of merchants.

30. The apparatus of claim 20 wherein the instructions for performing the third level process include instructions for prioritizing the second subset of merchants.

31. The apparatus of claim 20 wherein the computer system is configured to automatically perform the first level, second level and third level processes.

32. The apparatus of claim 20 wherein the data elements include predicted future sales based on previous sale activity.

33. The apparatus of claim 20 wherein the data elements include dollar amount at risk based on projected merchant activity.

34. The apparatus of claim 20 wherein the data elements include number of transactions in a particular time period that were not approved.

35. The apparatus of claim 20 wherein the data elements include number of times in a particular period of time a merchant has been identified as potentially risky.

36. A computer system for identifying merchant risk, the system comprising:

a host computer for periodically receiving transaction data elements for a plurality of merchants, the host computer including a first set of rules, the host computer having a processor being operative to apply the first set of rules to the data elements so as to determine a first list of merchants for review and to determine a rule score for each merchant included in the first list of merchants; and a database in communication with the host computer for receiving the first list of merchants, as well as associated data elements and rule scores, the database including second and third sets of rules, the database being operative to apply the second set of rules to the first list of merchants and the associated data elements and rule scores so as to selectively identify merchants for which credit scores are to be obtained, the database also being operative to obtain a credit score for each selectively identified merchant, the database further being operative to apply the third set of rules to the first list of merchants and associated data elements, rule scores and credit scores so as to determine a second list of merchants requiring from the first list of merchants requiring additional processing, wherein the associated data elements, rules scores, and credit scores used in the application of the third set of rules indicate that a merchant included in the second list of merchants is at risk of not being in a financial position to fund chargebacks associated with that merchant, and the database being operative to transmit results of the third level process associated with at least one of the second subset of merchants to at least one workstation for further review.

37. The computer system of claim 36 wherein the host computer is operative to automatically apply the first set of rules, and the database is operative to automatically apply the second and third sets of rules.

* * * * *

UNITED STATES PATENT AND TRADEMARK OFFICE
CERTIFICATE OF CORRECTION

PATENT NO. : 7,620,592 B2  Page 1 of 1
APPLICATION NO. : 09/795050
DATED : November 17, 2009
INVENTOR(S) : O'Mara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2503 days.

Signed and Sealed this

Twenty-sixth Day of October, 2010

David J. Kappos
*Director of the United States Patent and Trademark Office*